UNITED STATES PATENT OFFICE.

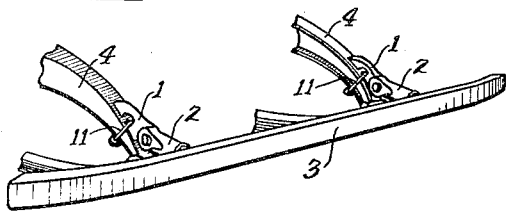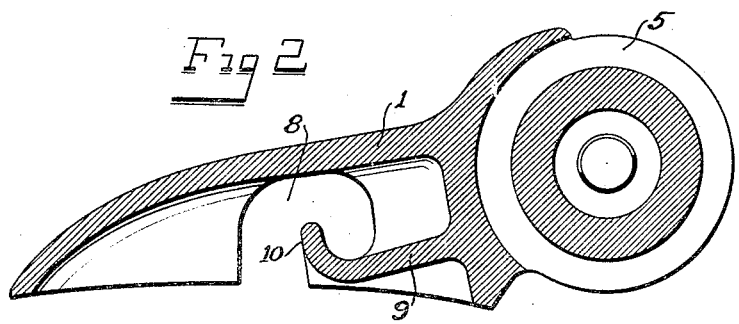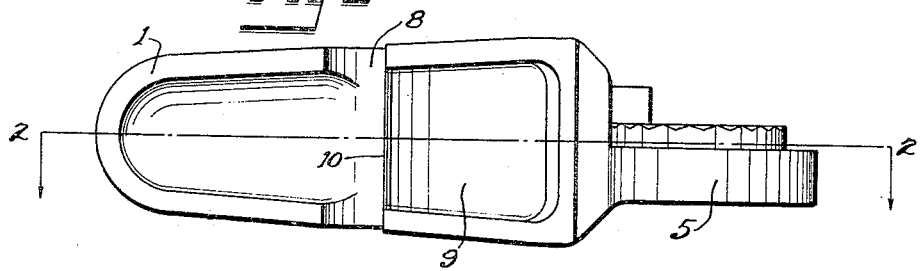

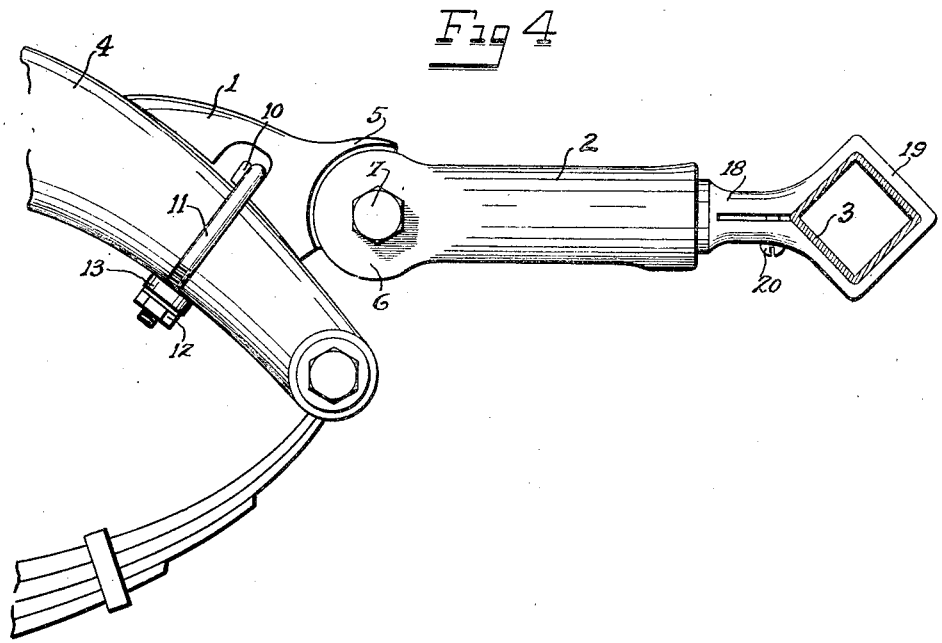
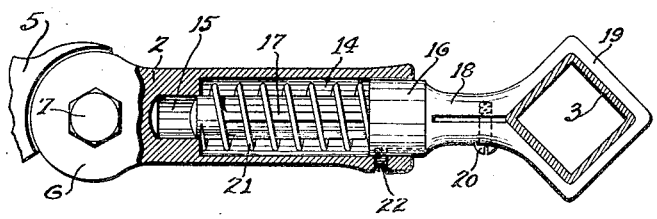
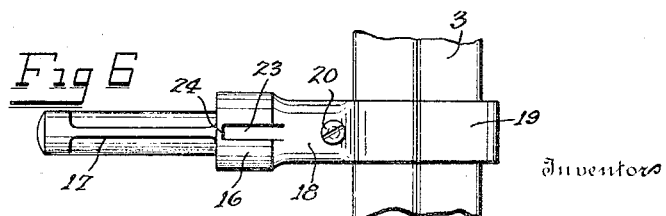

JAMES TURNER AND PEARL P. CRABILL, OF SPRINGFIELD, OHIO.

BUMPER FOR AUTOMOBILES.

1,253,306.   Specification of Letters Patent.   Patented Jan. 15, 1918.

Application filed May 27, 1915. Serial No. 30,765.

*To all whom it may concern:*

Be it known that we, JAMES TURNER and PEARL P. CRABILL, citizens of the United States, residing at Springfield, in the county of Clark and State of Ohio, have invented certain new and useful Improvements in Bumpers for Automobiles, of which the following is a specification.

This invention relates to improvements in bumpers for automobiles of the type set forth in Letters-Patent No. 974,212 dated Nov. 1st 1910.

One of the objects of the invention is to provide improved means for attaching the bumper to the vehicle.

A further object of the invention is to simplify, improve and cheapen the manner of attaching the buffer-bar to the main support of the bumper.

A further object of the invention is to simplify, cheapen and make more effective devices of this character.

In the accompanying drawings:—

Figure 1 is a perspective view of a bumper embodying the improvements shown attached to the forward end of the frame of a motor vehicle.

Fig. 2 is a longitudinal section on the line 2—2 of Fig. 3 of the rear member of the head of the bumper.

Fig. 3 is a bottom plan view of the same.

Fig. 4 is a side elevation of the device shown attached to the forward end of the frame of a motor vehicle with the buffer bar shown in section.

Fig. 5 is a longitudinal section of the forward member of the supporting head, showing the buffer bar connection associated therewith.

Fig. 6 is a bottom plan view of a portion of the buffer bar and one of its connecting stems.

Like parts are represented by similar characters of reference in the several views.

The bumper shown in the drawings is one of the adjustable type, meaning by that that its supporting head is formed in two parts adjustably connected together in order that the buffer-bar may be adjusted to different heights, but the improvements are also applicable to bumpers of other types.

In said drawings, 1 represents the rear member and 2 the forward member of one of the heads which connects the buffer bar 3 and supports it from the vehicle frame, the outer forward ends of the frame being represented by 4. The respective members of the head are provided with circular bosses 5, having serrated faces, connected together by the bolt 7; the head member 2 by this arrangement being capable of being adjusted up or down to adjust the height of the bar 3.

That part of the member 1 which is fitted to the frame is preferably formed in the nature of a hollow casting open at the bottom with its sides cored out to form recesses, 8, and also having an integrally formed transversely extending web 9, the rear portion 10 of which extends upwardly into the recessed portions 8 so as to provide in effect a hook-shaped member on the bottom of the head to which access may be had by reason of the recesses 8. Arranged to engage this hook-shaped member is a clip 11, the sides of which extend downwardly along the sides of the frame 4 and are screwthreaded to receive nuts 12 which clamp against the interposed plate or washer 13, which is loosely placed upon both sides of the clip so as to clamp the member 1 to the frame.

This construction is one which not only provides an exceptionally rigid connection between the head member 1 and the frame 4, but also presents a pleasing appearance and provides a smooth exterior for the head member 1, which can be easily cleaned.

The member 2 of the head is also preferably cast and cored out to form a large bore 14 and a reduced bore 15 at the rear end of the large bore. Fitted to the large bore 14 is an enlarged portion 16 of a stem 17, the forward portion of which is provided with a slotted neck 18 and a socket 19 to receive and clamp the buffer bar 3, a screw 20 being provided to draw the slotted portions of the neck together to clamp the socket to the bar; the metal forming the neck and socket having enough resiliency for this purpose. The rear end of the stem 17 is slidably fitted to the reduced bore 15 and interposed between the rear end of the bore 14 and the enlarged portion 16 is a coil spring 21 which normally projects the buffer bar and the stems forwardly, this forward movement being limited by a projecting pin in the nature of a headless screw 22, threaded into a screwthreaded opening in the forward end of the member 2, with its inner end projecting into a longitudinally extending recess 23 in the enlarged portion 16 of the stem. This recess terminates at a point removed from the extreme rear end of the enlarged portion 16 so as to form a shoulder 24 which coacts with the pin 22 to limit the forward movement of the parts.

By this construction, it will be seen that the screws or pins 22 may be adjusted to take up any wear, between the sliding stems and the bar, thereby eliminating rattling, and this construction also obviates the necessity of machining the parts to obtain an accurate fit, thereby cheapening the manufacture.
Having thus described our invention, we claim:—

1. In a bumper for automobiles, a supporting head, a device for securing said head to a portion of the vehicle, said device consisting of a transverse part which extends through the head at a point below the upper surface thereof and side portions which embrace the vehicle part, together with means for clamping the same to said vehicle part, the connection between said securing device and said head being such that said head may be removed without removing said device from said vehicle part.

2. In a bumper for automobiles, a supporting head, a hook-shaped projection on the interior of said head, and means engaging with said hook-shaped projection for securing same to the vehicle.

3. In a bumper for automobiles, a supporting head formed from cast metal, said head having a recess in the under side thereof, a hook-shaped projection extending into said recess, and means engaging with said hook-shaped projection for securing said head to the vehicle.

4. In a bumper for automobiles, a supporting head, said head having a recess formed in the under side thereof, a hook-shaped projection formed on said head extending into said recess, and a clip engaging said hook-shaped projection to clamp the same to the vehicle part.

In testimony whereof, we have hereunto set our hands this 15th day and 4th days of May, 1915, respectively.

JAMES TURNER.
PEARL P. CRABILL.

Copies of this patent may be obtained for five cents each, by addressing the "Commissioner of Patents, Washington, D. C."